United States Patent [19]

Tanaka et al.

[11] Patent Number: 5,322,368
[45] Date of Patent: Jun. 21, 1994

[54] DOUGH MIXER

[75] Inventors: Masaaki Tanaka; Tomio Sugimoto, both of Sano, Japan

[73] Assignee: House Food Industrial Co., Ltd., Higashi-Osaka, Japan

[21] Appl. No.: 38,098

[22] Filed: Mar. 30, 1993

[30] Foreign Application Priority Data

Sep. 16, 1992 [JP] Japan .................................. 4-245362

[51] Int. Cl.$^5$ .............................................. B01F 7/00
[52] U.S. Cl. ......................................... 366/76; 99/348; 241/101.8; 366/77; 366/79; 366/99; 366/279
[58] Field of Search .................... 99/348, 468, 353; 366/70, 77, 97, 331, 292, 601, 79-81, 299, 325, 96, 98, 99, 205, 279, 87-89, 314-317; 241/101.8, 282.1, 282.2

[56] References Cited

U.S. PATENT DOCUMENTS

| 3,963,220 | 6/1976 | Ohchi | 366/98 |
|---|---|---|---|
| 4,010,932 | 3/1977 | Otto | 366/77 |
| 4,095,517 | 6/1978 | Janovtchik | 99/495 |
| 4,504,152 | 3/1985 | Moller et al. | 99/348 |
| 4,630,930 | 12/1986 | Seiling | 366/77 |
| 4,650,337 | 3/1987 | Otto | 241/101.8 |
| 4,938,250 | 7/1990 | Peterson . | |
| 4,997,285 | 3/1991 | Schmidt | 241/101.8 |
| 5,063,840 | 11/1991 | Vote | 366/77 |
| 5,100,240 | 3/1992 | D'Alterio | 366/99 |
| 5,176,069 | 1/1993 | Chen | 99/348 |
| 5,183,640 | 2/1993 | Peter et al. | 366/77 |

FOREIGN PATENT DOCUMENTS

| 1103850 | 3/1961 | Fed. Rep. of Germany . |
|---|---|---|
| 2518662 | 11/1976 | Fed. Rep. of Germany . |
| 8915142 | 3/1990 | Fed. Rep. of Germany . |
| 1470770 | 2/1967 | France . |
| 1478197 | 4/1967 | France . |
| 56-155628 | 12/1981 | Japan . |
| 1103273 | 2/1968 | United Kingdom . |

Primary Examiner—Timothy F. Simone
Attorney, Agent, or Firm—Mason, Fenwick & Lawrence

[57] ABSTRACT

A dough mixer has a dough material feeding inlet and a dough discharging outlet at upper and lower portions of a housing, in which a mixing member is disposed. The dough mixer further includes at least one metal shutter member for opening and closing the dough material feeding inlet and the dough discharging outlet, and a guide rail member contacting of the at least one of metal shutter member for guiding motion of the shutter member through an established motion path, the guide rail member being formed of a synthetic resin. The at least one shutter member for removing a dough material in the motion path of the shutter expels compressed air at its tip.

13 Claims, 2 Drawing Sheets

DOUGH MIXER

BACKGROUND OF THE INVENTION

1. Field of the Invention

The present invention relates generally to a dough mixer. More specifically, the invention relates to a dough mixer, in which a material feeding inlet and a dough discharging outlet are provided at upper and lower portions of a housing having disposed therein a mixing member.

2. Description of the Related Art

A dough mixer having a dough material feeding inlet and a dough discharging outlet at upper and lower portions of a housing having disposed therein a mixing member is provided with shutter members at the dough material feeding inlet and the dough discharging outlet for closing both during kneading, opening the shutter member at the dough material feeding inlet during feeding of the material and opening the shutter member at the dough discharging outlet during discharging of dough.

Conventionally, the shutter member is formed of a metal plate. The shutter member is supported on the housing by guide rails mounted on the stationary portion of the housing and a plurality of gun-metal pins arranged along the guide rails.

In the conventional dough mixer set forth above, upon closing the shutter member, namely upon shutting off the dough material feeding inlet and the dough discharging outlet, difficulty can be encountered due to presence of dough material within a path of motion of the shutter for opening and closing. Also, the dough material can be clamped between the tip of the shutter member and the peripheral edge of the dough material feeding inlet or the dough discharging outlet to block complete shutting off of the shutter member.

In addition, due to the presence of the dough material within the opening and closing path of the shutter member and due to non-uniform frictional resistance between the shutter member and the guide rails and/or the gun-mental pins, the shutter member can become oblique during opening and closing motion to wear the gun-mental pins. Wearing of the gun-mental pins results in direct frictional contact between the dough mixer main body and the shutter member. Wearing also creates small metal chips or metal particles to be mixed to the dough material, which is quite undesirable for a food material.

SUMMARY OF THE INVENTION

In view of the problems set forth above, it is an object of the present invention to provide a dough mixer which has shutter members facilitating complete shutting off of a dough material feeding inlet and a dough discharging outlet.

Another object of the present invention is to provide a dough mixer, in which the shutter member can constantly slide while maintaining a parallel orientation so that the shutter member will not be worn by the supporting structure therefor so that a possibility of mixing of metal chips or metal particles into a material can be successfully avoided.

In order to accomplish the above-mentioned and other objects, a dough mixer, according to one aspect of the invention, which has a dough material feeding inlet and a dough discharging outlet at upper and lower portions of a housing, in which a mixing member is disposed, comprises:

at least one metal shutter member for opening and closing the dough material feeding inlet and the dough discharging outlet; and a guide rail member contacting the at least one metal shutter member for guiding motion of the shutter through an established motion path, the guide rail member being formed of a synthetic resin and having means provided at the tip of the at least one shutter member for removing a dough material in the motion path of the shutter.

In the preferred construction, at least one shutter member has a recess in its tip for receiving the dough material removing means. More preferably, the at least one of shutter member has a first portion extending over the dough material removing means at one side and a second portion extending over the dough material removing means at the other side, the second portion of the tip end extending beyond the position of the tip end of the first portion. The dough material removing means may practically comprise a pressurized air discharging means.

The guide rail member may contact the upper and lower surfaces and the side edge of the at least one shutter member. In the preferred construction, the synthetic resin forming the guide rail member may be selected among resin materials having a low friction coefficient, and is hard-wearing, high-impact, flexible, chemical-resistant, workable, sanitary, and non-susceptible to water, non-water susceptibility, such as polytetrafluoroethylene.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
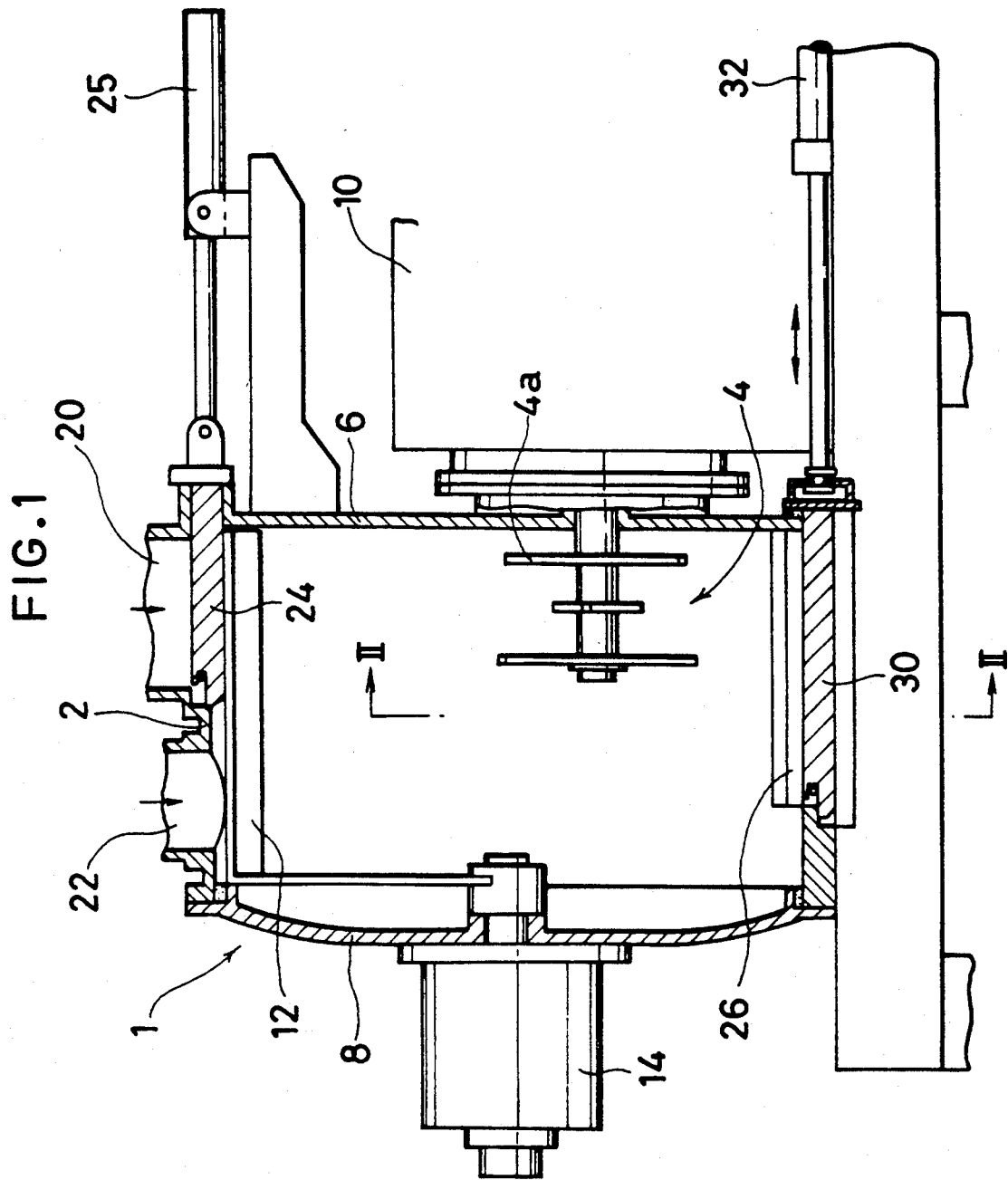
FIG. 1 is a vertical section of the preferred embodiment of a dough mixer according to the present invention.

Discussion will be given herebelow in detail of the preferred embodiment of a dough mixer according to the present invention. The dough mixer 1 generally comprises an essentially cylindrical housing 2 which is arranged horizontally, a planar disc plate 6 closing one axial end of the housing 2, and an operable lid 8 openably closing the other axial end of the housing 2.

Planar disc plate 6 is provided with a kneading screw 4 at a position downwardly offset from the center of plate 6. The kneading screw 4 includes three screw members 4a, each having two vanes. The screw members 4a are supported at orientations to provide between them angular intervals of 60°. The kneading screw 4 has a diameter approximately one third of the diameter of the housing 2 and adapted be driven by a drive motor 10 at a speed of about 1000 r.p.m. On the other hand, a rotary scraper 12 is mounted on the openable lid 8, which serves for scraping off the dough material adhering on the internal surface of the housing 2. The rotary scraper 12 is driven by a drive motor 14 to rotate at a speed of about 25 r.p.m. to move through a position in close proximity of the internal surface.

At an upper portion of the housing 2, a dough material feeding inlet 20 is provided for feeding the dough material and an additive feeding inlet 22 is provided for feeding salt necessary for kneading and spices, such as oil or so forth. An inlet shutter member 24 for opening and closing the dough material feeding inlet 20 is driven reciprocally by means of a hydraulic cylinder 25. On the other hand, at a lower portion of the housing 2, an outlet shutter 30 for opening and closing a dough discharge outlet 26 is driven reciprocally by a hydraulic cylinder 32.

It should be noted that the dough material feeding inlet 20 and the dough discharging outlet 26 have substantially the same constructions. Therefore, a detailed discussion given hereinafter with reference to FIGS. 2 and 3 is directed to that of the dough discharging outlet.

Figure 2:
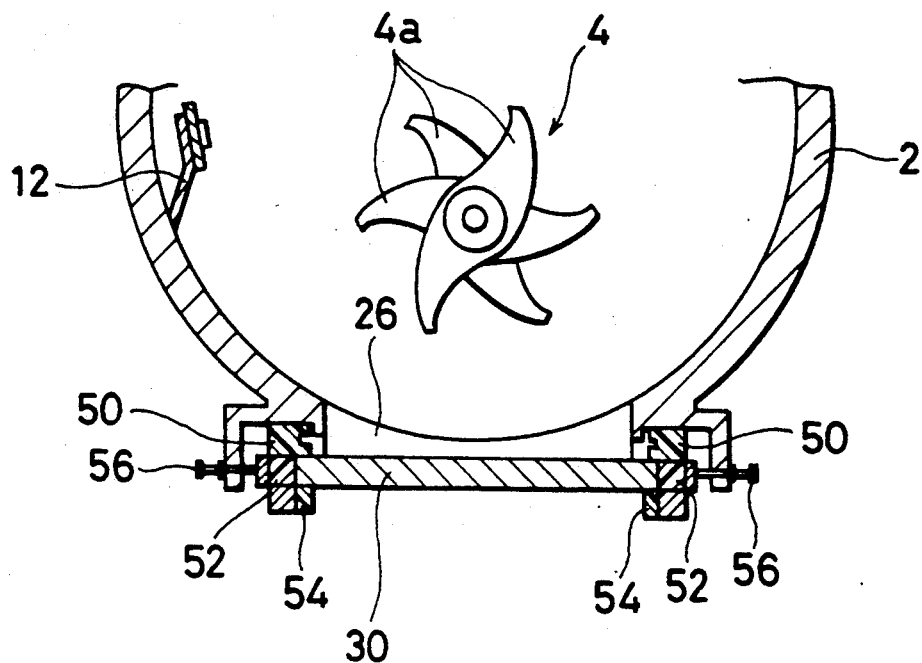
FIG. 2 is a vertical section of the dough mixer taken along line II—II of FIG. 1.
Figure 3:
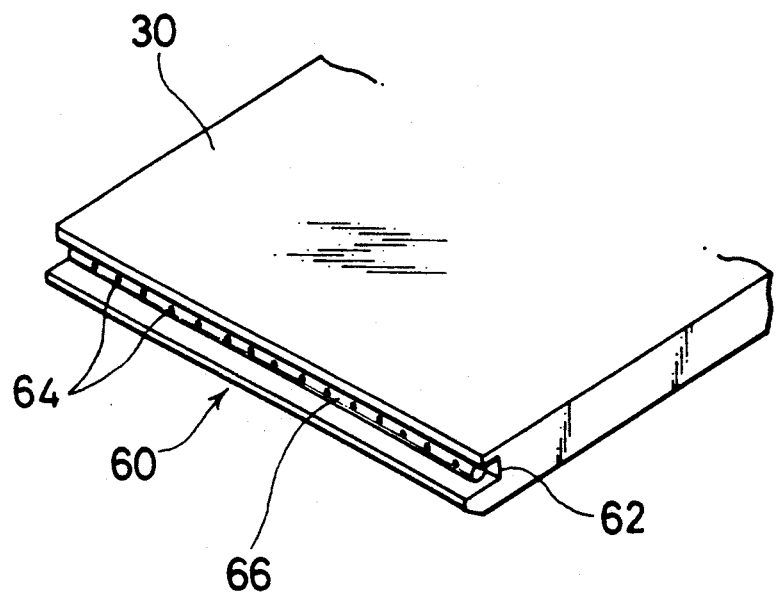
FIG. 3 is a perspective view of the tip portion of a shutter of a discharge outlet.

As shown in FIGS. 2 and 3, the outlet shutter member 30 of the dough discharge outlet 26 is slidably supported by a pair of guide rails 50, 52 and 54. The material of the guide rails 50, 52 and 54 may be selected from materials having a low friction coefficient, and is hard-wearing, high-impact, flexible, chemical-resistant, workable, sanitary, and non-susceptible to water, and so forth, such as polytetrafluoroethylene (Teflon: registered trademark), ultra-high-molecular-weight polyethylene and so forth. The guide rail 50 contacts the upper surface of the outlet shutter member 30. On the other hand, the guide rail 52 contacts side edge air injection holes 64 in air blow tube 66 which is is disposed within a recess 62 in the side edge of outlet shutter member 30 for injecting pressurized air therethrough. The tip of the outlet shutter member 30 at the lower side of the recess 62 is extended frontwardly beyond the position of the tip at the upper side of the recess.

The operation of the dough mixer constructed as set forth above will be discussed hereblow. Upon initiation of operation of the dough mixer, a distance between the guide rail 52 and the outlet shutter member 30 is adjusted by the adjusting screw 56 to approximately 0.1 mm. Subsequently, the dough material feeding inlet 20 is opened to feed the dough material into the housing 2. Thereafter, by injecting the pressurized air through the air injection holes 64 the air blow tube 66, the inlet shutter member 24 is driven to the closed position to shut off the dough material feeding inlet 20. Therefore, the dough material left in the path of closing motion of the inlet shutter member 24 as it closes can be blown off. Then, the kneading screw 4 and the rotary scraper 14 are driven to rotate. The desired additives are fed through the additive feeding inlet 22 during the kneading operation. After completion of kneading, the dough discharge outlet 26 is opened by driving the outlet shutter member 30 to the open position while the kneading screw 4 and the rotary scraper 12 are held in rotation, for discharging the dough from the housing.

With the present invention, the metal shutter member is supported by the guide rails formed of a resin material and contacting the upper surface, side edge and the lower surface of the shutter member. Also, the shutter member is constructed to have a stepped portion to project the lower side of the tip frontwardly and an air blow tube positioned at the stepped portion. Therefore, according to the present invention, the dough material or dough remaining in the path of motion of the shutter member can be successfully blown off by the pressurized air injected through the air blow tube so as to permit the shutter member to completely close the corresponding dough material feeding inlet or the dough discharging outlet. Also, sweeping off of the remaining dough material or dough is effective for maintaining the shutter member horizontal so that is may always move maintaining a parallel orientation. In addition, since the support structure will never cause the wearing of the shutter member metal chips or metal particles will never be mixed in the dough material.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments and equivalents thereof with respect to the features set out in the appended claims.

What is claimed is:

1. A dough mixer comprising:
   a housing having an upper portion, a lower portion, a dough material feeding inlet at said upper portion, and a dough discharging outlet at said lower portion;
   at least one metal shutter member for opening and closing said inlet and said outlet, said at least one metal shutter member having opposed upper and lower surfaces, opposed side edges, and a tip; and
   a guide rail member contacting said at least one metal shutter member for guiding motion of said at least one metal shutter member through an established motion path to open and close said inlet and said outlet, said guide rail member being formed of a synthetic resin; and
   wherein said at least one metal shutter member includes means provides at said tip for removing dough material in the motion path thereof.

2. The dough mixer of claim 1, wherein said tip of said at least one shutter member has a recess therein, said dough material removing means being positioned within said recess.

3. The dough mixer of claim 2, wherein said shutter member has first and second end portions defining a recess extending across said tip, and wherein said dough material removing means is received within said recess.

4. The dough mixer of claim 2, wherein said dough material removing means comprises means for discharging pressurized air.

5. The dough mixer of claim 1, wherein said guide rail member contacts said upper and lower surfaces and said side edges of said at least one shutter member.

6. The dough mixer of claim 1, wherein said synthetic resin forming said guide rail member has a low friction coefficient, is hard-wearing, high-impact, flexible, chemical-resistant, workable, sanitary, and non-susceptible to water.

7. The dough mixer of claim 6, wherein said synthetic resin is polytetrafluoroethylene.

8. The dough mixer of claim 6, wherein said synthetic resin is ultra-high-molecular-weight polyethylene.

9. The dough mixer of claim 5, further comprising means associated with said guide rail member for adjusting the position of said guide rail member relative to said side edges of said at least one shutter member.

10. A dough mixer comprising:
a housing having an upper portion, a lower portion, a dough material feeding inlet at said upper portion, and a dough discharging outlet at said lower portion;
a shutter member movable between and open position and a closed position relative to one of said inlet and said outlet for selectively opening and closing said one of said inlet and said outlet, said shutter member having opposed upper and lower surfaces, opposed side edges, and a leading edge; and
guide rail means for slidably guiding motion of said shutter member along a path of motion between said open and closed positions, said guide rail means having a low fraction coefficient, being hard-wearing, high-impact, flexible, chemical-resistant, workable, sanitary, and non-susceptible to water; and
wherein said shutter member includes means provided at said leading edge for removing dough material remaining in the path of motion of said shutter member as said shutter member is guided by said guide rail means.

11. The dough mixer of claim 10, wherein said guide rail means is formed of a synthetic resin selected between polytetrafluoroethylene and ultra-high-molecular-weight polyethylene.

12. The dough mixer of claim 10, wherein said shutter member has first and second end portions defining a recess extending across said leading edge, and wherein said dough material removing means is received within said recess.

13. The dough mixer of claim 12, wherein said second end portion extends beyond said first portion.

* * * * *